United States Patent [19]

Hagy et al.

[11] 4,315,991
[45] Feb. 16, 1982

[54] VERY LOW EXPANSION SEALING FRITS

[75] Inventors: Henry E. Hagy; Francis W. Martin, both of Painted Post, N.Y.

[73] Assignee: Corning Glass Works, Corning, N.Y.

[21] Appl. No.: 218,358

[22] Filed: Dec. 19, 1980

[51] Int. Cl.$^3$ .......................... C03C 1/00; C03C 3/22
[52] U.S. Cl. ............................................. 501/26; 501/4; 501/69; 65/43
[58] Field of Search ................................. 106/39.7, 52

[56] References Cited

U.S. PATENT DOCUMENTS

| | | | |
|---|---|---|---|
| 3,006,775 | 10/1961 | Chen | 106/39.7 |
| 3,220,815 | 11/1965 | McMillan | 106/39.7 |
| 3,499,787 | 3/1970 | Inoue | 106/39.7 |
| 3,634,111 | 1/1972 | Foster | 106/39.7 |
| 3,812,689 | 5/1974 | Reade | 106/39.7 |
| 3,856,497 | 12/1974 | Hummel | 106/39.7 |
| 3,907,577 | 9/1975 | Kiefer | 106/39.7 |
| 3,929,494 | 12/1975 | Veres | 106/39.7 |
| 3,978,315 | 8/1976 | Martin | 427/125 |
| 4,111,708 | 9/1978 | Flannery | 106/39.7 |

OTHER PUBLICATIONS

Petzold, "Metastabile Mischkrimstalle mit Quarzstruktur mit Oxidsystem $Li_2O$—MgO—ZnO—$Al_2O_3$—$SiO_2$", Glasstechn. Ber., vol. 40, No. 10 (1967) pp. 385–395.

Primary Examiner—Brian E. Hearn
Attorney, Agent, or Firm—Clinton S. Janes, Jr.

[57] ABSTRACT

This invention is drawn to thermally devitrifiable sealing glasses capable of forming sound seals with glasses, glass-ceramics, and ceramics having coefficients of thermal expansion (0°–300° C.) between about $0.5$–$5 \times 10^{-7}/°$ C. In finely fritted form, the glasses can be sintered and crystallized in situ at about 900°–1000° C. The glasses consist essentially, expressed in weight percent on the oxide basis, of about 1–2% $Li_2O$, 0.7–1.5% MgO, 9–13% ZnO, 19–23% $Al_2O_3$, 62–68% $SiO_2$, and at least 1% $K_2O + Rb_2O + Cs_2O$ in the indicated proportions of 0–3% $K_2O$, 0–4% $Rb_2O$, and 0–6% $Cs_2O$.

3 Claims, No Drawings

VERY LOW EXPANSION SEALING FRITS

BACKGROUND OF THE INVENTION

Most light weight mirrors for reflecting telescopes have been prepared from fused silica or a $SiO_2$—$TiO_2$ glass, one example of which is Code No. 7971, marketed by Corning Glass Works, Corning, New York, under the trademark ULE fused silica. That glass has the approximate analysis of 92.5% $SiO_2$ and 7.5% $TiO_2$. The very low expansion of those materials has recommended their utility for that application since substantial variations in ambient temperatures have little effect upon the conformation and contour of the mirrors.

In the past, mirror elements have been sealed to one another utilizing high temperature fusion techniques (1500°–1700° C.). At such elevated temperatures, however, thermal deformation of the elements can occur and this problem is exacerbated when the individual elements are designed of less bulk so as to yield a lighter overall final structure. Stated differently, as the mass of the elements is reduced, there is less bulk therein to resist thermal deformation. This detrimental distortion can be virtually eliminated via sealing with a frit capable of flow at relatively low temperatures. Unfortunately, the commercially-available stable sealing glasses and thermally devitrifiable sealing glasses exhibit coefficients of thermal expansion which are much too high to produce sound seals with fused silica or Code No. 7971.

For example, U.S. Pat. No. 3,951,669 describes the utility of zinc beta-quartz as a refractory and low expansion filler to reduce the thermal expansion of PbO—$B_2O_3$ and PbO—$B_2O_3$—$SiO_2$ sealing glasses. As observed in that patent, the zinc beta-quartz used for that purpose demonstrated a coefficient of thermal expansion of $-16.7\times10^{-7}/°C$. In contrast, the base PbO-containing sealing glasses exhibited coefficients of thermal expansion of about $100\times10^{-7}/°C$. and higher. The additions of zinc beta-quartz were able to lower the overall expansion to somewhat less than $50\times10^{-7}/°C$.

As another example, U.S. Pat. No. 3,954,486 discloses sealing glasses within the PbO—$B_2O_3$—ZnO base field containing low expansion particulate fillers selected from the group of $SiO_2$, beta-spodumene, petalite, $Al_2O_3$, clay, beta-eucryptite, $ZrO_2$, zircon, and aluminosilicate glasses. Beta-spodumene and beta-eucryptite are well-recognized as displaying coefficients of thermal expansion approximating zero. However, the base glasses to which the fillers were added had coefficients of thermal expansion of about $100\times10^{-7}/°C$. or more. Consequently, the goal of the invention was to incorporate a sufficient amount of the filler to yield a composite material having a thermal expansion of $65\times10^{-7}/°C$. or somewhat less.

Thermally devitrifiable sealing glasses had their origin in U.S. Pat. No. 2,889,952. Such glasses are capable of forming a conventional fused vitreous seal and thereafter undergoing a thermally induced, nucleated-type of crystallization wherein the glass separates into a vitreous phase and a crystalline phase, the latter being composed of fine-grained crystals relatively uniform in size and substantially homogeneously distributed throughout the residual vitreous matrix. The resulting layer of sealing material exhibits essentially uniform physical characteristics which are ordinarily considerably different from those of the parent glass. Most advantageously, the devitrified glass is customarily much more refractory than the precursor body. Three illustrations of such products are reported below.

U.S. Pat. No. 2,889,952 explicitly describes thermally devitrifiable sealing glasses having base compositions within the PbO—ZnO—$Al_2O_3$—$B_2O_3$—$SiO_2$ system which are suitable for sealing materials having coefficients of thermal expansion of about $80$–$120\times10^{-7}/°C$. No crystallographic data are provided but the specification points out that the thermal expansion of the precursor glass is relatively unimportant in sealing applications since the physical properties of the glass in its devitrified state determine the amount and nature of any stress developed in a seal.

U.S. Pat. No. 3,063,198 discusses thermally devitrifiable sealing glasses having base compositions within the PbO—$B_2O_3$ system and containing $P_2O_5$ and/or $V_2O_5$ and/or $Cr_2O_3$ as a nucleating agent. Again, no crystallographic data are provided but the coefficients of thermal expansion of the devitrified material appear to range about $90$–$100\times10^{-7}/°C$.

U.S. Pat. No. 3,258,350 discloses means for modifying the coefficient of thermal expansion of devitrifiable sealing glasses by including inert filler materials therein. The patent specifically describes the incorporation of particulate zircon into base sealing glass compositions within the PbO—ZnO—$B_2O_3$—$SiO_2$ field to yield a composite material demonstrating a coefficient of thermal expansion substantially below that of the base glass in the devitrified state.

As can be appreciated, none of the above-described materials would be suitable for forming sound seals with fused silica or Code No. 7971. Hence, research has been continuous to develop sealing glasses of either the stable or thermally devitrifiable type for use with those materials.

As was noted above, zinc beta-quartz is recognized as possessing one of the lowest coefficients of thermal expansion known. U.S. Pat. No. 3,681,097 discloses the production of glass-ceramic articles wherein zinc petalite solid solution or a zinc stuffed beta-quartz solid solution constitutes the predominant crystal phase. The patent describes compositions consisting essentially, expressed in weight percent on the oxide basis, of about 13–40% ZnO, 9–26% $Al_2O_3$, 40–75% $SiO_2$, and a nucleating agent selected from the group of 3–10% $ZrO_2$ and 0.001–0.5% of a noble metal selected from the group of copper, gold, palladium, platinum, and silver. The essentially complete absence of alkali metal oxides is demanded and the alkaline earth metal oxides MgO, CaO, and SrO are preferably absent.

Thermally devitrifiable zinc aluminosilicate glass compositions suitable for providing a protective coating for lithium aluminosilicate glass-ceramic plates are described in U.S. Pat. No. 3,978,315. The glass-ceramic plates commonly contained beta-eucryptite, beta-eucryptite solid solution, beta-spodumene, beta-spodumene solid solution, or mixtures thereof as the principal crystal phase and demonstrated coefficients of thermal expansion (0°–800° C.) of about $-10$ to $20\times10^{-7}/°C$. The inventive glasses consisted essentially, expressed in weight percent on the oxide basis, of about 12–25% ZnO, 0–3% MgO, 0–3% CoO, 15–25% ZnO+MgO+CoO, 15–28% $Al_2O_3$, 50–65% $SiO_2$, and at least about 5% total of oxides not exceeding the indicated proportions selected from the group of up to 1% $K_2O$, up to 5% $Cs_2O$, and up to 4% BaO.

The method for coating the glass-ceramic plate contemplated forming a slurry or paste of powdered glass in a suitable oil vehicle and then applying the slurry or paste onto the plate by brushing, spraying, silk screening, doctor blading, or other conventional technique. The resulting coating is thereafter fired to remove the vehicle, to sinter and bond the glass to the plate, and to crystallize the glass in situ to secure the desired crystallized layer. Sintering of the glass can take place at about 925°–950° C. and crystallization thereof at temperatures within the range of about 825°–950° C.

In general, the formation of a glass seal utilizing a devitrifiable sealing glass involves five steps:

(a) the sealing glass batch is melted;

(b) the melt is cooled to a glass and the glass comminuted to a very fine powder;

(c) the powdered glass is mixed with a conventional binder and vehicle;

(d) the resultant suspension or slurry is applied onto the surfaces to be sealed together; and (e) the surfaces to be sealed are brought together and fired to burn out the binder and vehicle and then to form a thermally devitrified seal therebetween.

Where a composition in the vicinity of the stoichiometry of zinc beta-quartz is melted and powdered glass prepared from the melt, the resultant powder crystallizes too rapidly to have utility as a sealing material. Thus, there is not enough flow taking place before devitrification to permit satisfactory covering and wetting of the surfaces to derive a sound seal therebetween.

SUMMARY OF THE INVENTION

The instant invention has the primary objective of modifying the base $ZnO$—$Al_2O_3$—$SiO_2$ composition to improve the sintering behavior of the glass and to alter the coefficient of thermal expansion to closely match that of fused silica in one instance and Code No. 7971 in another. Improved sinterability and the use of high silica levels, thereby improving the durability of the glass, can be secured by replacing up to about one-forth of the ZnO with $Li_2O$ on a mole basis. Substitutions of $Li_2O$ for ZnO in much greater amounts, however, lead to the development of crystal phases other than beta-quartz. For example, where $Li_2O$ and ZnO are present in equimolar amounts, the crystallization developed is initially beta-quartz but this phase is converted to beta-spodumene at higher temperatures. Whereas the inclusion of $Li_2O$ improves the sinterability of the glasses, the material still crystallizes so rapidly that good sealing is difficult to control. The addition of $K_2O$ and/or $Rb_2O$ and/or $Cs_2O$ delays the crystallization, thereby resulting in a practical sealing material.

The following is illustrative of a composition, in moles, demonstrating sinterability at temperatures within the interval of 925°–975° C.

| 0.25 | $Li_2O$ |
| 0.75 | ZnO |
| 1.00 | $Al_2O_3$ |
| 5.25 | $SiO_2$ | which translates into approximate weight percent values of:

| $Li_2O$ | 1.5% |
| ZnO | 12.5 |
| $Al_2O_3$ | 21.1 |
| $SiO_2$ | 64.9 |

To retard the rate of crystallization during sintering, 4% by weight $Cs_2O$ was added. With that particular composition, the substitution of 0.094 mole MgO for an equivalent amount of ZnO must be made to obtain an expansion match for Code No. 7971 and the replacement of 0.16 mole ZnO with MgO to achieve an expansion match with fused silica. [As employed herein, the mismatch between the sealing composition and the mirror material should be small, i.e., not over about 100 ppm (parts per million) over the intervals between the firing temperature and room temperature and between room temperature and the temperature at which the structure will see use, e.g., temperatures as low as −195° C. Where the use temperature is other than the finishing temperature (typically room temperature), the difference in mismatch between the sealing composition and the mirror material at room temperature and that at the use temperature is much more critical than either mismatch by itself.]

Accordingly, a preferred glass (excluding the addition of $Cs_2O$) will consist essentially, in moles, of:

| Match for Code No. 7971 | | Match for Fused $SiO_2$ | |
| --- | --- | --- | --- |
| 0.25 | $Li_2O$ | 0.23 | $Li_2O$ |
| 0.094 | MgO | 0.15 | Mgo |
| 0.656 | ZnO | 0.62 | ZnO |
| 1.00 | $Al_2O_3$ | 1.00 | $Al_2O_3$ |
| 5.25 | $SiO_2$ | 5.69 | $SiO_2$ | which translates into approximate weight percent values of:

| Match for Code No. 7971 | | Match for Fused $SiO_2$ | |
| --- | --- | --- | --- |
| $Li_2O$ | 1.5% | $Li_2O$ | 1.36% |
| MgO | 0.8 | MgO | 1.23 |
| ZnO | 11.1 | ZnO | 9.87 |
| $Al_2O_3$ | 21.2 | $Al_2O_3$ | 20.14 |
| $SiO_2$ | 65.4 | $SiO_2$ | 67.4 |

The values recited below are recalculated to a nominal 100% to reflect the addition of 4% by weight $Cs_2O$ to the above compositions:

| Match for Code No. 7971 | | Match for Fused Silica | |
| --- | --- | --- | --- |
| $Li_2O$ | 1.44 | $Li_2O$ | 1.31 |
| MgO | 0.77 | MgO | 1.18 |
| ZnO | 10.67 | ZnO | 9.48 |
| $Al_2O_3$ | 20.38 | $Al_2O_3$ | 19.37 |
| $SiO_2$ | 62.89 | $SiO_2$ | 64.81 |
| $Cs_2O$ | 3.85 | $Cs_2O$ | 3.85 |

Finally, the table below reports the compositions of the frits as analyzed in weight percent:

| Match for Code No. 7971 | | Match for Fused Silica | |
| --- | --- | --- | --- |
| $Li_2O$ | 1.54 | $Li_2O$ | 1.30 |
| MgO | 0.95 | MgO | 1.18 |
| ZnO | 9.9 | ZnO | 9.0 |
| $Al_2O_3$ | 20.9 | $Al_2O_3$ | 21.1 |
| $SiO_2$ | 61.7 | $SiO_2$ | 63.5 |
| $Cs_2O$ | 3.8 | $Cs_2O$ | 3.7 |

Greater quantities of $Cs_2O$ can be included, e.g., up to 7% by weight, with satisfactory results. However, such additions result in more residual glassy phase. Consequently, a maximum amount of no greater than about 5% is preferred.

The zinc beta-quartz crystals developed in the inventive materials contain $Zn^{+2}$, $Li^+$, and $Mg^{+2}$ in the charge balancing positions in the crystal lattice. Because magnesium beta-quartz crystals demonstrate a coefficient of thermal expansion of about $40 \times 10^{-7}/°C.$, a small amount of MgO will exert a substantial effect upon the overall expansion of the inventive materials.

Where desired, small amounts of $K_2O$ and/or $Rb_2O$ can be substituted for all or part of the $Cs_2O$. However, because of the glassy phase developed through the incorporation of those materials, the addition of $K_2O$ when present alone will be limited to about 3% and that of $Rb_2O$ to about 4%. Because of the greater effect upon expansion which $K_2O$ and $Rb_2O$ exert, somewhat less MgO will be required to cause the expansion of the crystalline product to match Code 7971 and fused silica.

We have learned that the small divalent cations $Co^{+2}$ and $Mn^{+2}$ can also be substituted for $Zn^{+2}$ ions in modifying the expansion of the crystalline product. However, because those ions have less effect upon the expansion of the crystalline product, about two-to-three times as much of those ions will be required to achieve the same effect as exhibited by $Mg^{+2}$ ions. Hence, up to 6% MnO and up to 9% CoO may optionally be present. Those ions impart color to the final product, however, which may or may not be desirable. Accordingly, the use of MgO to adjust the expansion of the crystalline product constitutes the preferred embodiment.

Laboratory investigations have indicated that the $SiO_2$ content can range from about 4.5–5.75 moles, the higher level yielding better sintering behavior; the $Li_2O$ content can vary between about 0.2–0.3 moles; the ZnO content can be operable over about 0.55–0.75 moles; the MgO content in the preferred embodiment is useful over about 0.08–0.2 moles; and the $Al_2O_3$ content can be effective over about 0.95–1.05 moles. In terms of weight percent, those components can vary as follows:

| | |
|---|---|
| $Li_2O$ | 1–2% |
| MgO | 0.7–1.5% |
| ZnO | 9–13% |
| $Al_2O_3$ | 19–23% |
| $SiO_2$ | 61–68% |

$K_2O$ and/or $Rb_2O$ and/or $Cs_2O$ will be incorporated into the composition to a total of about 8% with the maximum of each being 3% $K_2O$, 4% $Rb_2O$, and 7% $Cs_2O$. Where desired, up to 9% total CoO+MnO may be included in the indicated proportions of 0–9% CoO and 0–6% MnO.

In general, the inventive sealing frits can be sintered satisfactorily at temperatures ranging between about 900°–1000° C., the time demanded for sintering being less at temperatures in the higher portions of the range than in the lower. Hence, the period of time sufficient to insure good sintering and crystallization of the frit may vary from as little as 0.5 hour at 1000° C. to eight hours and more at temperatures around 900° C. It will be recognized that some sintering will be observed at temperatures somewhat above the annealing point of the frits. However, the generally low crystal yields developed at those temperatures plus poor flow have militated against the use of such temperatures. Hence, 900° C. has been deemed to constitute a practical minimum sintering temperature. Sintering temperatures much in excess of 1000° C. hazard the development of unwanted metastable crystal phases in the structure. The above-described preferred compositions form very sound seals after firing for two hours at 950° C.

A particularly desirable feature of the preferred composition recited above is the finding of a relatively broad temperature range wherein a firing period of two hours yields a satisfactory and predictable thermal expansion match with fused silica. That composition makes it possible to superimpose a second firing (useful for repair or assembly in some cases) and still maintain an acceptable match of thermal expansions.

Whereas the above description has been directed to substrates consisting of fused silica or Code No. 7971, it will be appreciated that the inventive frits would also be operable with other glasses or glass-ceramic and ceramic bodies exhibiting coefficients of thermal expansion over the interval of about $-5$ to $5 \times 10^{-7}/°C.$ so long as such did not suffer substantial thermal deformation and/or expansion change during firing, i.e., temperatures of at least 900° C. Thus, the invention provides for the careful and precise control of the thermal expansion of the sealant through minor variations in the quantities of the basic constituents.

DESCRIPTION OF THE PREFERRED EMBODIMENTS

A batch suitable for preparing the above-described preferred glass was compounded. The actual batch ingredients may comprise any materials, either the oxides or other compounds, which, when melted together, will be converted into the desired oxides in the proper proportions. The batch ingredients were placed into a platinum crucible, the crucible introduced into a furnace operating at about 1650° C., the batch melted for about six hours, and the melt poured into a steel mold to yield a glass slab having dimensions of about $6'' \times 6'' \times \frac{1}{2}''$. The slab was thereafter ground to pass a No. 400 United States Standard Sieve (37 microns) and to an average particle size of about 10 microns. Such finely-divided material insures sufficient flow during sintering to insure a sound seal. The preferred method for grinding the glass contemplates ball milling in a non-polar medium, in this instance xylene. This practice has proven to be superior to fluid energy milling where a small amount of organic contamination was produced which resulted in raising the thermal expansion of the devitrified product when sintering was conducted at the higher extreme of the firing range. The glass powder was then mixed into an oil conventionally utilized in commercial silk screening decorating to form a suspension containing about 74% by weight of glass particles. The suspension was rolled onto a plane or curved surface upon which the core section of a light weight mirror was pressed. The core section was then transferred to the mirror face. After placing the parts in the necessary positions, the mirror assembly was fired at 950° C. for two hours.

A determination of a match in thermal expansion between the sealing material and the substrate was undertaken by means of seal tests. Thus, a uniform layer of the suspension of powdered glass and screen oil is applied to both sides of a small slab of Code No. 7971 or fused silica, conveniently about $1.9 \times 1.3 \times 0.17$ cm. After firing, the seal is examined via birefringence measurements.

To achieve high and consistent strength seals, the preferred practice requires etching the surfaces to be joined together, for example with an aqueous HF solution, prior to applying the sealant.

We claim:

1. A thermally devitrifiable sealing glass suitable for sealing to glass, glass-ceramic, and ceramic articles having coefficients of thermal expansion ranging between about $-5$ to $5 \times 10^{-7}/°C.$, said sealing glass consisting essentially, expressed in weight percent on the oxide basis, as calculated from the batch, of about 1-2% $Li_2O$, 9-13% ZnO, 0-1.5% MgO, 19-23% $Al_2O_3$, 61-68% $SiO_2$, and 1-8% $K_2O + Rb_2O + Cs_2O$ in the indicated proportions of 0-3% $K_2O$, 0-4% $Rb_2O$, and 0-7% $Cs_2O$, said glass being capable of forming sound seals when fired at about 900°–1000° C. and developing zinc beta-quartz crystals.

2. A thermally devitrifiable sealing glass according to claim 1 containing up to 9% total CoO+MnO in the indicated proportions of 0-9% CoO and 0-6% MnO in place of ZnO.

3. A thermally devitrifiable sealing glass according to claim 1 exhibiting a thermal expansion mismatch with fused silica not exceeding 100 ppm consisting essentially, in approximate weight percent on the oxide basis, of 1.31% $Li_2O$, 1.18% MgO, 9.48% ZnO, 19.37% $Al_2O_3$, 64.81% $SiO_2$, and 3.85% $Cs_2O$.

* * * * *